Figure 1:
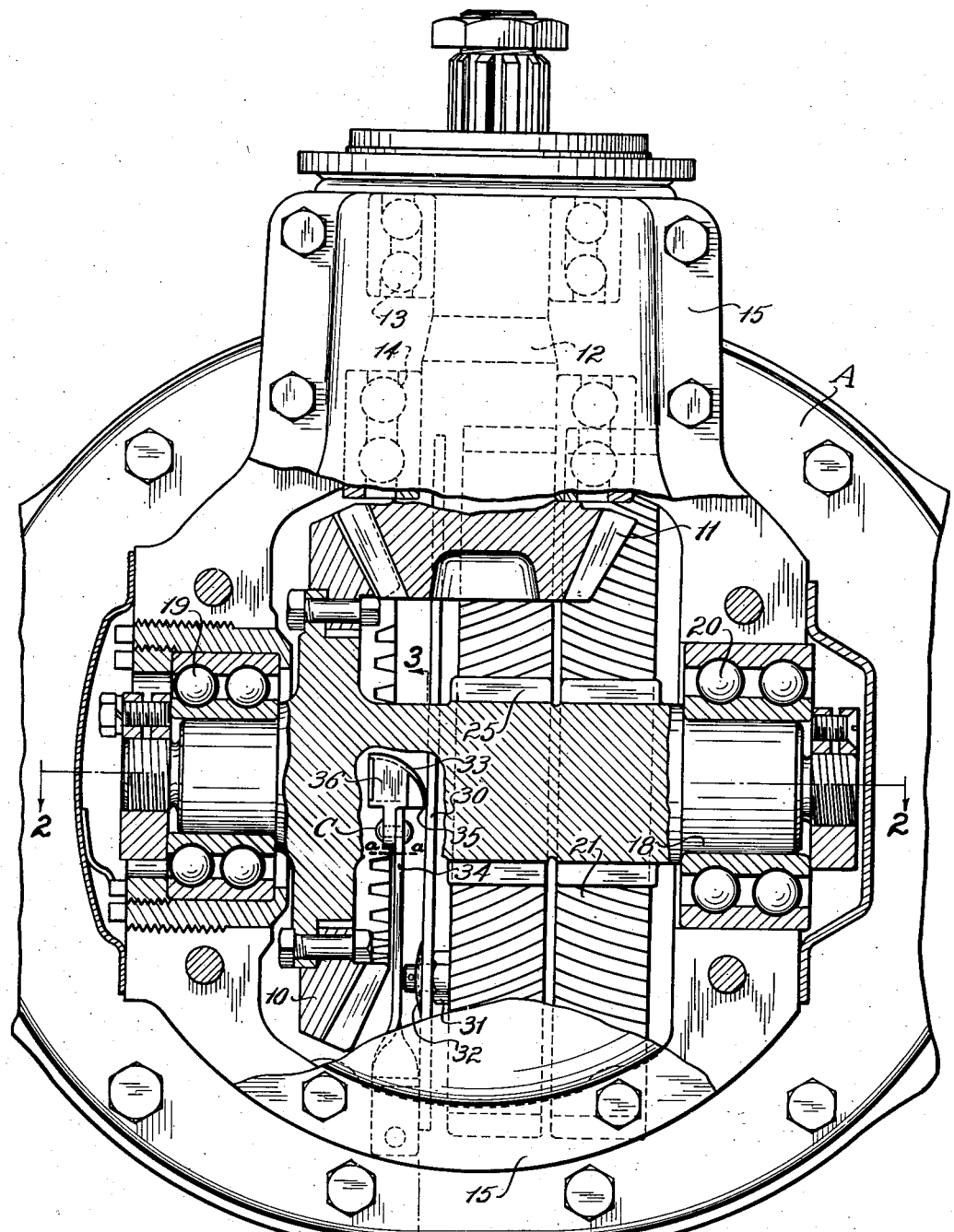

Feb. 14, 1939.   G. W. CARLSON ET AL   2,147,144
AUTOMOTIVE DRIVE AXLE
Filed Sept. 18, 1936    2 Sheets-Sheet 1

INVENTORS.
GUSTAV W. CARLSON
BY ROBERT C. RUSSELL
Huis, Hudson & Kent
ATTORNEYS.

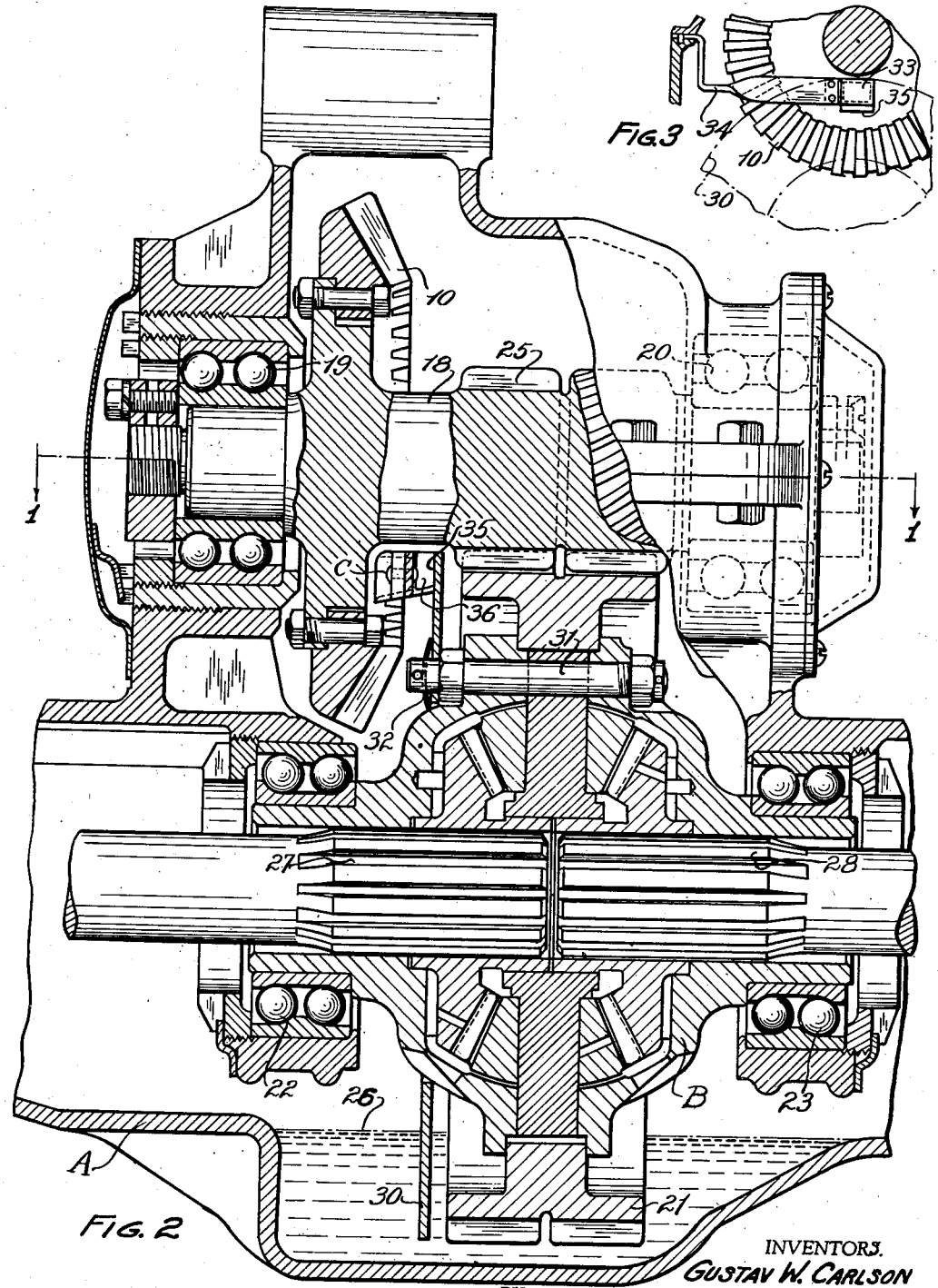

Patented Feb. 14, 1939

2,147,144

UNITED STATES PATENT OFFICE

2,147,144

AUTOMOTIVE DRIVE AXLE

Gustav W. Carlson, Cleveland Heights, and Robert C. Russell, Shaker Heights, Ohio, assignors to Eaton Manufacturing Company, Cleveland, Ohio, a corporation of Ohio Application September 18, 1936, Serial No. 101,448

1 Claim. (Cl. 184—11)

The present invention relates to drive axles for automotive vehicles and more particularly to a knee type double reduction axle including means for lubricating certain parts thereof located above the normal level of the lubricant in the axle housing.

An object of the present invention is the provision of a novel and improved automotive drive axle provided with means for lubricating a rotating member or part thereof located above the normal level of the lubricant in the axle housing at all speeds within the range of operation of the vehicle.

Another object of the present invention is the provision of a novel and improved knee type double reduction automotive drive axle comprising means for lubricating the pinion connected to the drive shaft and the gear that meshes therewith at all speeds within the range of operation of the vehicle.

The present invention resides in certain novel details of construction, combinations and arrangements of parts, and further objects and advantages thereof will be apparent to those skilled in the art to which it relates from the following description of the preferred embodiment described with reference to the accompanying drawings, forming a part of this specification, in which similar reference characters designate corresponding parts throughout the several views, and in which:

Fig. 1 is a plan view, with portions broken away and other portions in section on the line 1—1 of Fig. 2 of an automotive rear driving axle embodying the present invention, Fig. 2 is a vertical section approximately on the line 2—2 of Fig. 1 with the collector or scraper per se in section on the line a—a, and Fig. 3 is a vertical section approximately on the line 3—3 of Fig. 1.

The present invention relates to knee type double reduction drive axles of automotive trucks wherein the bevel gear which meshes with the drive pinion is located above the normal level of the lubricant in the axle housing and is herein illustrated and described as embodied in such an axle. The automotive axle shown in the drawings is a well known commercial axle modified in accordance with the teaching of the present invention and only those parts of the axle which are necessary to a complete understanding of the present invention will be herein referred to and described in detail.

Referring to the drawings the reference character 10 designates a bevel gear in mesh with a bevel pinion 11 formed integral with a short shaft 12 rotatably supported by anti-friction bearings 13 and 14 in the rear axle housing designated generally by the reference character A. The bevel gear 10 is fixed to a short shaft 18 rotatably supported by anti-friction bearings 19 and 20 retained in position in the axle housing A by a cap member 15 forming a part of the rear axle housing. The differential unit assembly B of the axle is rotatably supported in the axle housing A, underneath the shaft 18, by anti-friction bearings 22 and 23 suitably supported in the axle housing A and is adapted to be driven or rotated from the shaft 18 through the medium of a herringbone type pinion 25 formed integral therewith which meshes with a herringbone ring gear 21 clamped between the two halves of the differential case. The right and left hand drive axles are designated by the reference characters 26 and 27, respectively, and the short shaft 12 which carries the drive pinion 11 is adapted to be connected to and driven from the main drive shaft of the vehicle in a manner well known in the art.

The bevel gear 10 is well above the normal level of the lubricant in the axle housing, which will vary somewhat, but is indicated generally by the dot-dash line 28. Prior to the present invention the bevel gears 10 and 11 were dependent, for lubrication, upon lubricant being thrown by centrifugal force from the differential assembly B and the pinion 25 onto the teeth thereof. At slow speeds such as often encountered in truck operation, the speed of rotation of the differential assembly, etc., was not high enough to throw sufficient lubricant onto the bevel gear and pinion to adequately lubricate the teeth thereof, with the result that these gears unduly wore and in some instances failed.

According to the provisions of the present invention the bevel gears 10 and 11 are supplied with an adequate amount of lubricant at all speeds within the range of operation of the vehicle by a collector or scraper which collects or scrapes lubricant from a peripheral or exterior part of a rotating member of the axle which extends below the normal level of the lubricant in the axle housing, such as the differential assembly, as the same rotates in operation, and conducts the lubricant thus collected to the bevel gear 10 and flows the same over the teeth thereof. As shown, the scraper designated generally by the reference character C, contacts or engages against an annular disk-like member 30 fixed to the differential housing in any convenient manner. As shown the disk-like member 30 is secured to the left hand ends of bolts 31 which secure the two halves of the differential housing together by spring or Belleville type washers 32 secured to the outer ends of the bolts 31 by cotter pins. The member 30 is so located that it is conveniently engaged or contacted by the scraper C.

The scraper C comprises a head 33 riveted or otherwise fixed to the free end of a spring arm 34, the other end of which is fixed or held in a slot cut in the axle housing underneath the cap member 15 previously referred to. The collector or scraper head 33 has a flat right hand edge 35 which contacts with the disk 30 and has an open channel 36 in the upper side thereof which conducts the lubricant scraped from the disk 30 to the teeth of the bevel gear 10. The spring arm 34 allows the head to follow the disk 30 even though it does not run quite true, and reduces the noise to a minimum. The disk 30 is of such a diameter that the lower part thereof extends below the normal level of the lubricant in the axle housing, and during operation of the axle the outer part of the disk rotates through the lubricant in the axle housing elevating a portion thereof with it to a position where it is scraped off by the collector or scraper 33. In the preferred embodiment of the invention just described a separate or additional member in the form of a disk 30 is provided against which the scraper engages, but it will be apparent that this is not always necessary, as the scraper may be made to engage against some suitable conventional part of the differential assembly such as the side of the ring gear, etc. It will also be understood that by the provision of suitable ducts, etc., the lubricant scraped from the disk 30 can be conducted to parts of the axle other than the bevel gear 10.

From the foregoing description of the preferred embodiment of the invention it will be apparent that the objects of the invention heretofore enumerated have been accomplished and that a novel and improved knee type double reduction automotive axle has been provided including means for lubricating a rotating member or part of an automotive drive axle located above the normal level of the lubricant in the reservoir thereof at all speeds within the range of operation of the vehicle. While the preferred embodiment of the invention has been described in considerable detail we do not wish to be limited to the particular construction shown which is merely illustrative of the invention and which may be varied within the scope thereof. It is our intention to hereby cover all adaptations, modifications and uses thereof that come within the practice of those skilled in the art to which the invention relates and we particularly point out and claim as our invention the following:

In a double reduction knee type automotive drive axle the combination of an axle housing having a lubricant reservoir in the lower part thereof, a ring gear and differential assembly having an annular surface thereon, means for rotatably supporting said assembly in said axle housing with the lower portion of said annular surface thereof extending below the normal level of the lubricant in said axle housing, a countershaft assembly comprising a bevel gear and pinion, means for rotatably supporting said assembly in said housing for rotation about an axis above said ring gear and differential assembly, the pinion of said countershaft assembly being in mesh with the ring gear of said ring gear and differential assembly, a bevel pinion rotatably supported in said housing and in mesh with the bevel gear of said countershaft assembly for driving the latter, a collector or scraper yieldably urged into continuous contact with said annular surface of said ring gear and differential assembly for scraping lubricant therefrom as said ring gear and differential assembly rotate in operation, and means for conducting lubricant from said collector or scraper to said bevel gear.

GUSTAV W. CARLSON.
ROBERT C. RUSSELL.